US008716951B2

United States Patent
Chen et al.

(10) Patent No.: US 8,716,951 B2
(45) Date of Patent: May 6, 2014

(54) ILLUMINATION CONTROLLING CIRCUIT AND ILLUMINATION SYSTEM

(75) Inventors: Chun-Kuang Chen, Taipei (TW); Po-Shen Chen, New Taipei (TW); Feng-Ling Lin, Pingtung (TW); Hui-Ying Chen, Changhua County (TW)

(73) Assignee: Lextar Electronics Corporation, Hsinchu (TW)

( * ) Notice: Subject to any disclaimer, the term of this patent is extended or adjusted under 35 U.S.C. 154(b) by 142 days.

(21) Appl. No.: 13/531,603

(22) Filed: Jun. 25, 2012

(65) Prior Publication Data

US 2013/0147354 A1 Jun. 13, 2013

(30) Foreign Application Priority Data

Dec. 9, 2011 (TW) .............................. 100145612 A

(51) Int. Cl.
*H05B 37/02* (2006.01)
(52) U.S. Cl.
USPC ............ 315/291; 315/246; 315/300; 315/307
(58) Field of Classification Search
USPC ......... 315/119, 246, 247, 291, 294, 297, 299, 315/300, 306, 307, 308
See application file for complete search history.

(56) References Cited

U.S. PATENT DOCUMENTS

| 5,872,429 | A | * | 2/1999 | Xia et al. ........................ 315/194 |
| 6,011,357 | A | * | 1/2000 | Gradzki et al. ................ 315/224 |
| 8,237,368 | B2 | * | 8/2012 | Lin et al. ........................ 315/177 |
| 8,466,632 | B2 | * | 6/2013 | Park .............................. 315/291 |
| 2011/0068706 | A1 | | 3/2011 | Otake et al. |
| 2011/0084622 | A1 | | 4/2011 | Barrow et al. |
| 2011/0121754 | A1 | | 5/2011 | Shteynberg et al. |

* cited by examiner

*Primary Examiner* — Tung X Le
(74) *Attorney, Agent, or Firm* — CKC & Partners Co., Ltd.

(57) ABSTRACT

The invention discloses an illumination controlling circuit coupled between a household electricity input and an illumination lamp. The illumination controlling circuit includes a dimmer module, a sampling-and-holding circuit, a differential circuit, an integrator circuit and a clamping circuit. The dimmer circuit is used for generating a dimming signal which includes a plurality of waveform pulses. The sampling-and-holding circuit samples from the dimming signal, so as to obtain an average waveform pulse. The differential circuit is used for extracting a voltage difference of the average waveform pulse. The integrator circuit performs integration on the average waveform pulse according to the voltage difference, so as to generate a direct current voltage signal. When a level of the direct current voltage signal exceeds a threshold voltage level of the clamping circuit, the direct current voltage signal is used for driving the illumination lamp.

10 Claims, 5 Drawing Sheets

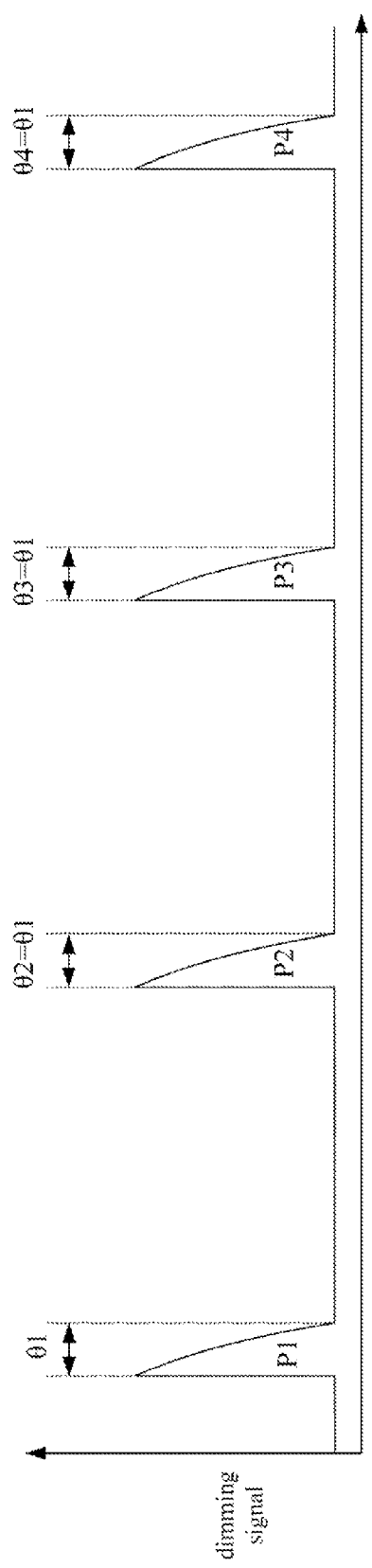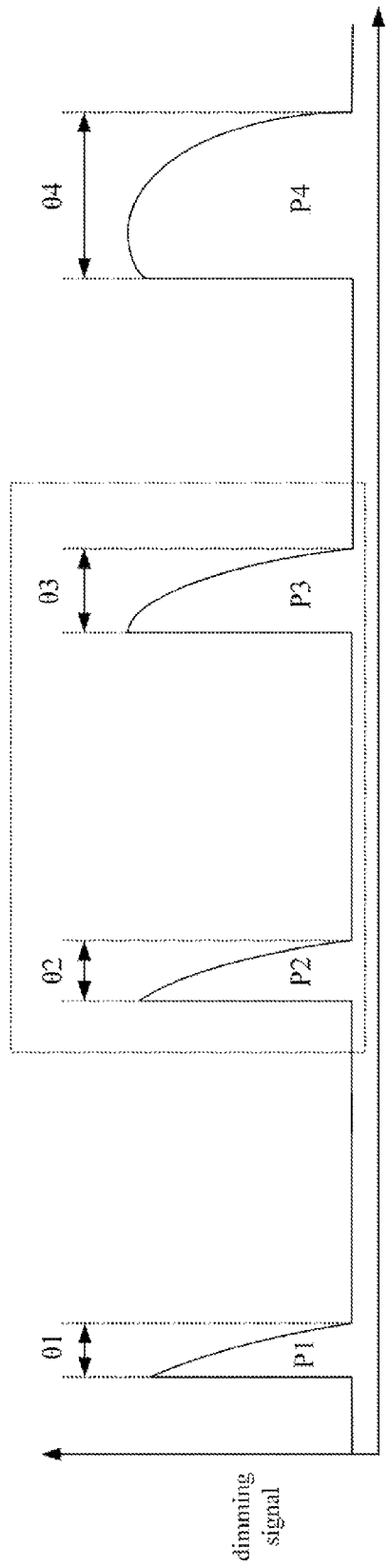

ILLUMINATION CONTROLLING CIRCUIT AND ILLUMINATION SYSTEM

RELATED APPLICATIONS

This application claims priority to Taiwan Patent Application Serial Number 100145612, filed Dec. 9, 2011, which is herein incorporated by reference.

BACKGROUND

1. Technical Field

The present disclosure relates to an illumination controlling circuit. More particularly, the present disclosure relates to an illumination controlling circuit with dimming functions.

2. Description of Related Art

With recent development of the photonics technology, many cutting-edge illumination equipments have been introduced to our daily life. For example, comprehensive attentions have been paid on fluorescent lamps and light-emitting diodes (LED) and their applications.

Among those equipments, a LED lamp has an efficiency superior to a traditional incandescent lamp, because most energy consumed by the LED lamp is transformed into a visible radiation. The LED lamp has a photoelectric conversion efficiency far higher than that of other lamps, and the LED lamps generates less heat during operation. Therefore, under a condition of same luminance, the LED lamp with a higher light-emitting efficiency has a lower operative temperature than that of the traditional incandescent lamp, such that the LED lamp suitable for the green-energy trend is widely used in all kinds of illumination applications.

Traditional incandescent lamps are usually cooperated with a tri-electrode alternating-current switch (TRIAC) dimmer, which is conveniently for users to adjust luminance of the incandescent lamps themselves, so as to prevent wasting energy and possible uncomfortable feelings of eyes due to the over-brightness. In general, the TRIAC may include a variable resistor, in which a resistance can be adjusted (e.g., with rotating a knob of the TRIAC) by users. In this way, users are able to control a conductive angel of the TRIAC, so as to change an output waveform of the TRIAC.

The dimming function of the TRIAC is realized in a phase-chopping manner. Reference is made to FIG. 1, which is a schematic diagram illustrating a dimming signal waveform generated by a tradition TRIAC dimmer. In FIG. 1, the waveform generated by the TRIAC is chopped according to its phases, and the dimming result is related to the conductive angle of the phase-chopping.

However, the LED lamp is a direct current (DC) load unlike the incandescent lamps, and thus is unable to directly apply the dimming function of the TRIAC. The LED lamp, directly driven by a waveform adjusted by the TRIAC dimmer, will blinks at a high frequency. Besides, when the dimming brightness is configured lower, the blinking becomes more severe. Therefore, an adjustable contrast range of the LED lamp with the TRIAC dimmer is limited.

Currently, the commercialized LED equipments utilize specific LED drivers for transforming household electricity into a fixed DC voltage signal, which is used to drive the light-emitting component in the LED for illumination. The DC voltage signal is set at a fixed voltage level. Therefore, the luminance cannot be adjusted easily. In order to keep up with the green-energy trend and users' demands, there is still a need to develop LED illumination equipments with practical dimming function.

SUMMARY

In order to solve the problems in the art, the disclosure provides an illumination controlling circuit and an illumination system.

An aspect of the invention is to provide an illumination controlling circuit coupled between a household electricity input and an illumination lamp. The illumination controlling circuit includes a dimming module, a sampling-and-holding circuit, a differential circuit, an integrator circuit and a voltage-clamping circuit. The dimming module is coupled with the household electricity input. The dimming module is configured for modulating an alternating current input signal from the household electricity input and generating a dimming signal. The dimming signal includes a plurality of waveform pulses. The sampling-and-holding circuit is coupled with the dimming module. The sampling-and-holding circuit is configured to continuously sample from the waveform pulses of the dimming signal to obtain an average waveform pulse from sampled waveform pulses. The differential circuit is coupled with the sampling-and-holding circuit, and is configured for extracting a voltage difference of the average waveform pulse. The integrator circuit is coupled with the differential circuit, and is configured for performing integration on the average waveform pulse according to the voltage difference, so as to generate a direct current voltage signal. The voltage-clamping circuit coupled between the integrator circuit and the illumination lamp. The voltage-clamping circuit has a threshold voltage level and applies the direct current voltage signal to the illumination lamp so as to light up the illumination lamp when a level of the direct current voltage signal exceeds the threshold voltage level of the clamping circuit.

According to an embodiment of the invention, the respective waveform pulses of the dimming signal have a conduction angle, which is adjustable.

According to an embodiment of the invention, the conduction angle, the level of the direct current voltage signal is in proportion to a luminance of the illumination lamp.

According to an embodiment of the invention, the voltage-clamping circuit blocks the direct current voltage signal to turn off the illumination lamp when the level of the direct current voltage signal is below the threshold voltage level of the clamping circuit.

Another aspect of the invention is to provide an illumination system coupled with a household electricity input. The illumination system includes an illumination lamp and an illumination controlling circuit. The illumination lamp emits light with different luminance according to an operative current flowing through the illumination lamp. The illumination controlling circuit is coupled with the household electricity input. The illumination controlling circuit includes a dimming module, a sampling-and-holding circuit, a differential circuit, an integrator circuit and a voltage-clamping circuit. The dimming module is coupled with the household electricity input. The dimming module is configured for modulating an alternating current input signal from the household electricity input and generating a dimming signal. The dimming signal includes a plurality of waveform pulses. The sampling-and-holding circuit is coupled with the dimming module. The sampling-and-holding circuit is configured to continuously sample the waveform pulses of the dimming signal to obtain an average waveform pulse from sampled waveform pulses. The differential circuit is coupled with the sampling-and-holding circuit configured for extracting a voltage difference of the average waveform pulse. The integrator circuit is coupled with the differential circuit configured for performing integration on the average waveform pulse according to the voltage difference, so as to generate a direct current voltage signal. The voltage-clamping circuit is coupled between the integrator circuit and the illumination lamp. The voltage-clamping circuit has a threshold voltage level and applies the direct current voltage signal to the illumination lamp so as to light up the illumination when a level of the direct current voltage signal exceeds the threshold voltage level of the clamping circuit. The operative current flowing through the illumination lamp is correspondingly varied with the level of the direct current voltage signal.

According to an embodiment of the invention, the respective waveform pulses of the dimming signal have a conduction angle, which is adjustable.

According to an embodiment of the invention, the conduction angle, the level of the direct current voltage signal is in proportion to a luminance of the illumination lamp.

According to an embodiment of the invention, the voltage-clamping circuit blocks the direct current voltage signal to turn off the illumination lamp when the level of the direct current voltage signal is below the threshold voltage level of the clamping circuit.

According to an embodiment of the invention, the illumination lamp further includes a switch unit, a lamp driver and a light-emitting load. A first end of the switch unit is coupled to the voltage-clamping circuit. A second end of the switch unit is coupled to the light-emitting load. The lamp driver is coupled between a third end of the switch unit and the light-emitting load. The switch unit selectively couples the first end to the second end or the third end.

According to an embodiment of the invention, the switch unit couples the first end to the second end under a dimming mode for applying the direct current voltage signal onto the light-emitting load. The switch unit couples the first end to the third end under a non-dimming mode for applying the direct current voltage signal to the lamp driver. As such, the lamp driver generates an operative current with a fixed current value to the light-emitting load.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiments, with reference to the accompanying drawings as follows:

FIG. 3 is a waveform diagram illustrating a dimming signal generated by the dimming module under an ideal condition;

FIG. 4 is a waveform diagram illustrating a dimming signal generated by the dimming module under a practical condition;

DESCRIPTION OF THE EMBODIMENTS

In an embodiment, the illumination controlling circuit includes a dimming module for adjusting luminance of an illumination lamp, and it further includes some digital processing circuit to sample the dimming signals generated by the dimming module and to generate a stable direct current voltage signal for driving the illumination lamp. In addition, the illumination controlling circuit has a clamping function. When a level of the direct current voltage signal is too low, the operative voltage is clamped to shut down the illumination lamp, so as to prevent the illumination lamp from blinking or being damaged under low operative voltage.

In the following description, several specific details are presented to provide a thorough understanding of the embodiments of the present invention. One skilled in the relevant art will recognize, however, that the present invention can be practiced without one or more of the specific details, or in combination with or with other components, etc. In other instances, well-known implementations or operations are not shown or described in detail to avoid obscuring aspects of various embodiments of the present invention.

Figure 1:
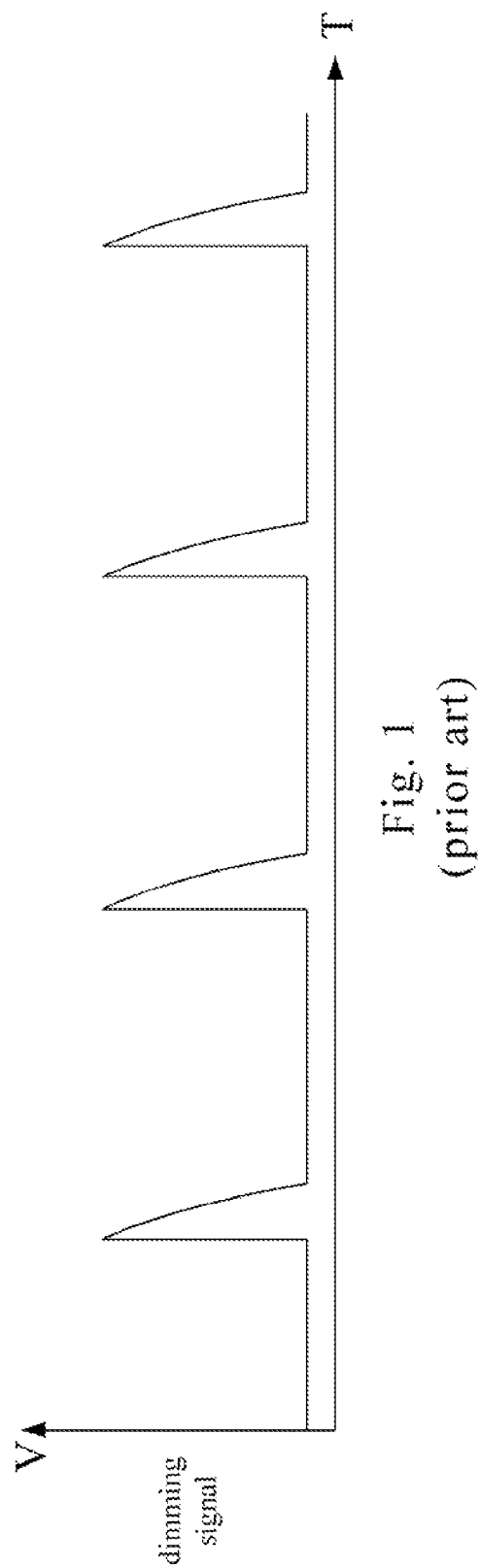
FIG. 1 is a schematic diagram illustrating a dimming signal waveform generated by a tradition TRIAC dimmer.
Figure 2:
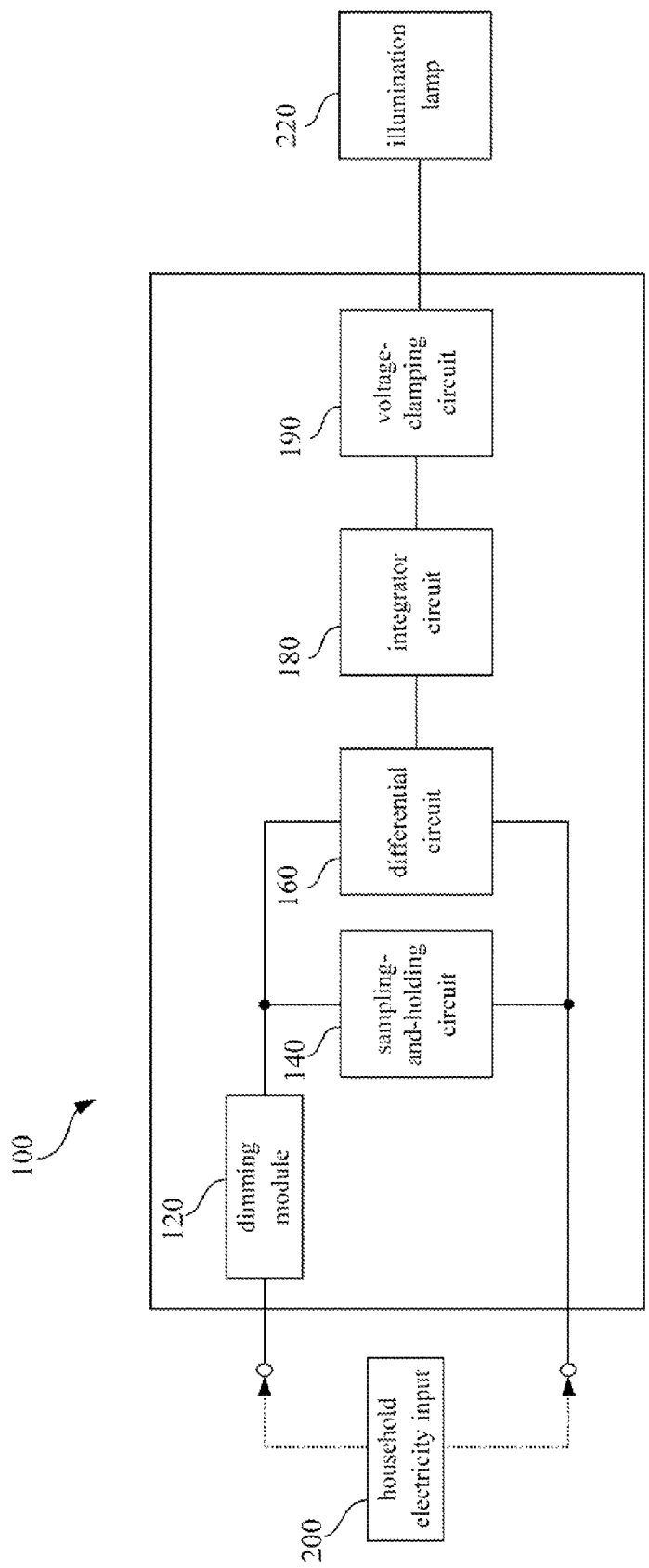
FIG. 2 is a function block diagram illustrating an illumination controlling circuit according to an embodiment of the invention.

Reference is made to FIG. 2, which is a function block diagram illustrating an illumination controlling circuit 100 according to an embodiment of the invention. As shown in FIG. 2, the illumination controlling circuit 100 is coupled between a household electricity input 200 and an illumination lamp 220. The illumination controlling circuit 100 includes a dimming module 120, a sampling-and-holding circuit 140, a differential circuit 160, an integrator circuit 180 and a voltage-clamping circuit 190.

The dimming module 120 is coupled with the household electricity input 200. In practical applications, the household electricity input 200 usually provides an alternating current (AC) input signal (e.g., 110V/220V AC voltage signal). The dimming module 120 is used to modulate the AC input signal from the household electricity input 200 into a dimming signal. In this embodiment, the dimming module 120 can be a tri-electrode alternating-current switch (TRIAC) dimmer. The dimming function of the TRIAC dimmer is realized in a phase-chopping manner. The waveform generated by the TRIAC dimmer is chopped by its phases. The dimming level is related to a conductive angle in the phase-chopping process.

Reference is also made to FIG. 3 and FIG. 4. FIG. 3 is a waveform diagram illustrating a dimming signal generated by the dimming module 120 under an ideal condition. FIG. 4 is a waveform diagram illustrating a dimming signal generated by the dimming module 120 under a practical condition.

As shown in FIG. 3 and FIG. 4, each waveform pulse P1, P2, P3 or P4 of the dimming signal has a conductive angle $\theta 1$, $\theta 2$, $\theta 3$ or $\theta 4$. The respective conductive angles $\theta 1$, $\theta 2$, $\theta 3$ and $\theta 4$ of the waveform pulses P1, P2, P3 and P4 are adjustable. For example, users may rotate a knob of the TRIAC dimmer to adjust the conductive angle for elevating a brightness level. In this case, the conductive angle will be enlarged for elevating the brightness level.

As the ideal condition shown in FIG. 3, the dimming signal generated by the dimming module 120 includes multiple waveform pulses. As shown in FIG. 3, when the dimming module 120 is configured to a specific brightness level by a user, the waveform pulses P1, P2, P3 and P4 generated by the dimming module 120 in sequence has an identical conductive angle. As shown in FIG. 3, the conductive angles of the waveform pulses P1, P2, P3 and P4 are all equal to the conductive angle $\theta 1$.

However, in practical applications, some tiny differences will exist between the waveform pulses P1, P2, P3 and P4 generated by the dimming module 120 because of the limitation of the manufacturing process, even when is the dimming level remains unchanged. As shown in FIG. 4, when the dimming level remains unchanged, the waveform pulses P1, P2, P3 and P4 in sequence still has different conductive angles, such as the conductive angles θ1, θ2, θ3 and θ4.

Reference is made to FIG. 2 and FIG. 4 at the same time, the sampling-and-holding circuit 140 of the illumination controlling circuit 100 in the embodiment is coupled to the dimming module 120 and used for sampling from the waveform pulses P1, P2, P3 and P4 of the dimming signal continuously, so as to obtain an average waveform pulse from sampled waveform pulses.

Figure 5:
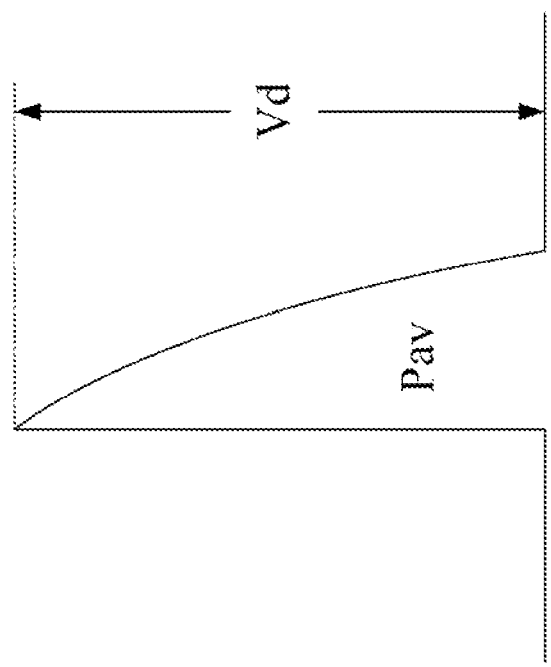
FIG. 5 is a waveform diagram illustrating an average waveform pulse generated by the sampling-and-holding circuit.

For example, in this embodiment, the sampling-and-holding circuit 140 may sample the waveform pulses P2 and P3 from the waveform pulses shown in FIG. 4 for generating an average waveform pulse. Reference is also made to FIG. 5, which is a waveform diagram illustrating an average waveform pulse Pa generated by the sampling-and-holding circuit 140. However, the invention is not limited to sample two waveform pulses in a row. In another embodiment, the sampling-and-holding circuit 140 may sample three or more waveform pulses in a row; or in another case, the sampling-and-holding circuit 140 may sample one waveform pulse in every K pulses (K is a positive integer). Accordingly, the sampling-and-holding circuit 140 may sample the dimming signal generated by the dimming module 120 and transform the dimming signal into a relatively-steady waveform state (i.e., the average waveform pulse).

In the embodiment, the differential circuit 160 is coupled to the sampling-and-holding circuit 140 for extracting a voltage difference Vd (as shown in FIG. 5) from the average waveform pulse Pav.

The integration circuit 180 is coupled with the differential circuit 160. The integration circuit 180 is used for integrating the sampled average waveform pulse Pav according to the voltage difference Vd, so as to generate a direct current (DC) voltage signal. The DC voltage signal can be used for driving the illumination lamp 220 to provide lights. The luminance of the illumination lamp 220 is higher (i.e., brighter) when a voltage level of the DC voltage signal is higher, such that the dimming function is realized.

Basically, the voltage level of the DC voltage signal is in direct proportion to the voltage difference Vd of the average waveform pulse Pav. Furthermore, the voltage level of the DC voltage signal is also in direct proportion to the conduction angle of the waveform pulses generated by the dimming module 120. In other words, the conduction angle, the level of the direct current voltage signal and the luminance of the illumination lamp 220 are in direct proportion. The luminance of the illumination lamp 220 is substantially decided by the conduction angle of the waveform pulses generated by the dimming module 120.

In this embodiment, the illumination lamp 220 may include a light-emitting diode (LED), which has advantages such as photoelectric conversion efficiency, less wasted heat and long lifetime, etc. However, the LED operated at low driving voltage may occurs problems including high-frequency blinking, unstable luminance or easy to be damaged in practical applications. In this embodiment, the illumination lamp 220 can be a LED lamp (such as product number MR16), but the invention is not limited thereto.

In the embodiment, the illumination controlling circuit 100 includes the voltage-clamping circuit 190 coupled between the integration circuit 180 and the illumination lamp 220. The voltage-clamping circuit 190 has a threshold is voltage level. When a level of the DC voltage signal exceeds a threshold voltage level of the clamping circuit, the voltage-clamping circuit 190 conducts the DC voltage signal to the illumination lamp 220, for driving the illumination lamp 220 to provide lights.

On the other hand, when the level of the DC voltage signal is below the threshold voltage level of the clamping circuit 190, the DC voltage signal is blocked by the voltage-clamping circuit 190, so as to turn off the illumination lamp. For example, the DC voltage signal is blocked by conducting the DC voltage signal to a ground terminal, or by turning down the switch located on a conductive path to the illumination lamp 220. In this case, the clamping circuit 190 can turn off the illumination lamp 220 when the DC voltage signal has a low voltage level (below the threshold voltage level), so as to prevent the LED within the illumination lamp 220 from blicking or being damaged under low operative voltage.

Figure 6:
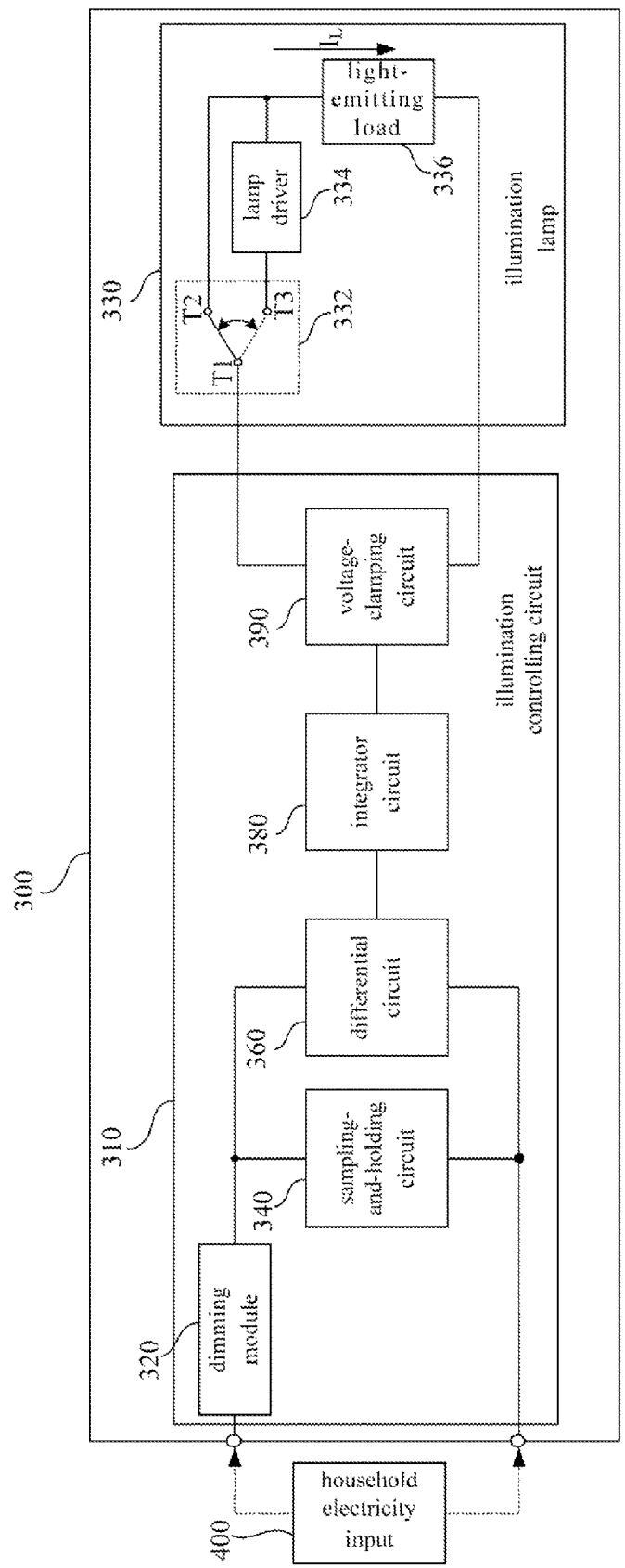
FIG. 6 is a function block diagram illustrating an illumination system according to another embodiment of the invention.

Reference is made to FIG. 6, which is a function block diagram illustrating an illumination system 300 according to another embodiment of the invention.

As shown in FIG. 6, the illumination system 300 is coupled with a household electricity input 400. The illumination system includes an illumination lamp 330 and a illumination controlling circuit 310. The illumination lamp 330 emits light with different luminance according to an operative current $I_L$ flowing through the illumination lamp 330.

The illumination controlling circuit 310 is coupled with the household electricity input 400. The illumination controlling circuit 310 includes a dimming module 320, a sampling-and-holding circuit 340, a differential circuit 360, an integrator circuit 380 and a voltage-clamping circuit 390. Each module within the illumination controlling circuit 310 is similar to the illumination controlling circuit 100 in aforesaid embodiment. The detail descriptions and explanations about these modules in illumination controlling circuit 310 can be found in the FIG. 2 to FIG. 5 and corresponding paragraphs related to the illumination controlling circuit 100, and not to be repeated here.

It is to be noticed that, when the DC voltage signal generated by the integration circuit 380 exceeds the threshold voltage level of the voltage-clamping circuit 390, the voltage-clamping circuit 390 conducts the DC voltage signal to the illumination lamp 330 for driving the illumination lamp 330 to provide lights. The amplitude of the operative current $I_L$ flowing through the illumination lamp is varied corresponding to the level of the direct current voltage signal.

In this embodiment, the conduction angle, the level of the direct current voltage signal, the amplitude of the operative current $I_L$ and a luminance of the illumination lamp 330 are in direct proportion.

In addition, the illumination lamp 330 shown in FIG. 6 further includes a switch unit 332, a lamp driver 334 and a light-emitting load 336. In practical applications, the light-emitting load 336 can be a light-emitting diode.

A first end T1 of the switch unit 332 is coupled to the voltage-clamping circuit 390. A second end T2 of the switch unit 332 is coupled to the light-emitting load 336. The lamp driver 334 is coupled between a third end T3 of the switch unit 332 and the light-emitting load 336. The switch unit 332 selectively couples the first end T1 to the second end T2 or the third end T3.

In this embodiment, the switch unit 332 couples the first end T1 to the second end T2 under a dimming mode for applying the direct current voltage signal generated by the illumination controlling circuit 310 onto the light-emitting load 336. The light-emitting load 336 emits light at different luminance (brightness) according to the configuration of the illumination controlling circuit 310.

In another case, when the dimming function is not required by users (i.e., under a non-dimming mode), the switch unit 332 couples the first end T1 to the third end T3 under the non-dimming mode for applying the direct current voltage signal to the lamp driver 334, and the lamp driver 334 generates an operative current Id with a fixed current value to the light-emitting load 336. Based on the operative current Id generated by the lamp driver 334 with fixed current value, the light-emitting load 336 may provide lights at a fixed luminance (brightness), such that the dimming function is disabled. In this embodiment, the illumination lamp 330 can be a LED lamp (such as product number MR16), and the lamp driver 334 can be a built-in lamp driver circuit of the MR16 LED lamp, but the invention is not limited thereto.

As mentioned in above paragraphs, the disclosure provides an illumination controlling circuit and an illumination system. In an embodiment, the illumination controlling circuit includes a dimming module for adjusting luminance of an illumination lamp, and it further includes some digital processing circuit to sample the dimming signals generated by the dimming module and to generate a stable direct current voltage signal for driving the illumination lamp. In addition, the illumination controlling circuit has a clamping function. When a level of the direct current voltage signal is too low, the operative voltage is clamped to shut down the illumination lamp, so as to prevent the illumination lamp from blinking or being damaged under low operative voltage.

As is understood by a person skilled in the art, the foregoing embodiments of the present invention are illustrative of the present invention rather than limiting of the present invention. It is intended to cover various modifications and similar arrangements included within the spirit and scope of the appended claims, the scope of which should be accorded with the broadest interpretation so as to encompass all such modifications and similar structures.

What is claimed is:

1. An illumination controlling circuit, coupled between a household electricity input and an illumination lamp, the illumination controlling circuit comprising:
    a dimming module, coupled with the household electricity input, configured for modulating an alternating current input signal from the household electricity input and generating a dimming signal, the dimming signal comprising a plurality of waveform pulses;
    a sampling-and-holding circuit, coupled with the dimming module, configured for continuously sampling the waveform pulses of the dimming signal to obtain an average waveform pulse from sampled waveform pulses;
    a differential circuit, coupled with the sampling-and-holding circuit, configured for extracting a voltage difference of the average waveform pulse;
    an integrator circuit, coupled with the differential circuit, configured for performing integration on the average waveform pulse according to the voltage difference, so as to generate a direct current voltage signal; and
    a voltage-clamping circuit, coupled between the integrator circuit and the illumination lamp, having a threshold voltage level, the voltage-clamping circuit applying the direct current voltage signal to the illumination lamp so as to light up the illumination lamp when a level of the direct current voltage signal exceeds the threshold voltage level of the clamping circuit.

2. The illumination controlling circuit as claimed in claim 1, wherein the respective waveform pulses of the dimming signal have a conduction angle which is adjustable.

3. The illumination controlling circuit as claimed in claim 2, wherein the conduction angle, the level of the direct current voltage signal is in proportion to a luminance of the illumination lamp.

4. The illumination controlling circuit as claimed in claim 1, wherein the voltage-clamping circuit blocks the direct current voltage signal to turn off the illumination lamp when the level of the direct current voltage signal is below the threshold voltage level of the clamping circuit.

5. An illumination system, coupled with a household electricity input, the illumination system comprising:
    an illumination lamp emitting light with a luminance according to an operative current flowing through the illumination lamp; and
    an illumination controlling circuit, coupled with the household electricity input, the illumination controlling circuit comprising:
        a dimming module, coupled with the household electricity input, configured for modulating an alternating current input signal from the household electricity input and generating a dimming signal, the dimming signal comprising a plurality of waveform pulses;
        a sampling-and-holding circuit, coupled with the dimming module, configured for continuously sampling the waveform pulses of the dimming signal to obtain an average waveform pulse from sampled waveform pulses;
        a differential circuit, coupled with the sampling-and-holding circuit, configured for extracting a voltage difference of the average waveform pulse;
        an integrator circuit, coupled with the differential circuit, configured for performing integration on the average waveform pulse according to the voltage difference, so as to generate a direct current voltage signal; and
        a voltage-clamping circuit, coupled between the integrator circuit and the illumination lamp, having a threshold voltage level, the voltage-clamping circuit applying the direct current voltage signal to the illumination lamp so as to light up the illumination lamp when a level of the direct current voltage signal exceeds the threshold voltage level of the clamping circuit, wherein the operative current flowing through the illumination lamp is correspondingly varied with the level of the direct current voltage signal.

6. The illumination system as claimed in claim 5, wherein the respective waveform pulses of the dimming signal have a conduction angle which is adjustable.

7. The illumination system as claimed in claim 6, wherein the conduction angle, the level of the direct current voltage signal is in proportion to a luminance of the illumination lamp.

8. The illumination system as claimed in claim 5, wherein the voltage-clamping circuit blocks the direct current voltage to turn off the illumination lamp when the level of the direct current voltage signal is below the threshold voltage level of the clamping circuit.

9. The illumination system as claimed in claim 5, wherein the illumination lamp further comprises a switch unit, a lamp driver and a light-emitting load, wherein a first end of the switch unit is coupled to the voltage-clamping circuit; a second end of the switch unit is coupled to the light-emitting load; the lamp driver is coupled between a third end of the switch unit and the light-emitting load; and the switch unit selectively couples the first end to the second end or the third end.

10. The illumination system as claimed in claim 9, wherein the switch unit, under a dimming mode, couples the first end to the second end for applying the direct current voltage signal onto the light-emitting load, and the switch unit, under a non-dimming mode, couples the first end to the third end for applying the direct current voltage signal to the lamp driver, such that the lamp driver generates an operative current with a fixed current value to the light-emitting load.

* * * * *